US012585507B2

(12) United States Patent
Ramanujan et al.

(10) Patent No.: US 12,585,507 B2
(45) Date of Patent: Mar. 24, 2026

(54) LOAD TESTING AND PERFORMANCE BENCHMARKING FOR LARGE LANGUAGE MODELS USING A CLOUD COMPUTING PLATFORM

(71) Applicant: MICROSOFT TECHNOLOGY LICENSING, LLC, Redmond, WA (US)

(72) Inventors: Sanjay Ramanujan, Bellevue, WA (US); Rakesh Kelkar, Bellevue, WA (US); Hari Krishnan Srinivasan, Bellevue, WA (US); Karthik Raman, Sammamish, WA (US); Hema Vishnu Pola, Hyderabad (IN); Sagar Taneja, Ghaziabad (IN); Mradul Karmodiya, Madya Pradesh (IN)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 568 days.

(21) Appl. No.: 17/975,506

(22) Filed: Oct. 27, 2022

(65) Prior Publication Data

US 2024/0143414 A1 May 2, 2024

(51) Int. Cl.
*G06F 9/50* (2006.01)

(52) U.S. Cl.
CPC ............ *G06F 9/5077* (2013.01); *G06F 9/505* (2013.01); *G06F 2209/501* (2013.01); *G06F 2209/5019* (2013.01); *G06F 2209/508* (2013.01)

(58) Field of Classification Search
CPC .. G06F 9/5077; G06F 9/505; G06F 2209/501; G06F 2209/5019;
(Continued)

(56) References Cited

U.S. PATENT DOCUMENTS

2016/0364307 A1    12/2016    Garg et al.
2019/0280918 A1     9/2019    Hermoni et al.
(Continued)

FOREIGN PATENT DOCUMENTS

CN        111353584 A      6/2020
CN        113867882 A     12/2021
CN        114116318 A      3/2022

OTHER PUBLICATIONS

Carvalho, et al., "Using machine learning techniques to analyze the performance of concurrent kernel execution on GPUs", In Journal of Future Generation Computer Systems, Jul. 15, 2020, 1 page.
(Continued)

*Primary Examiner* — Sisley N Kim

(74) *Attorney, Agent, or Firm* — Newport IP, LLC; Jacob P. Rohwer

(57) ABSTRACT

The techniques disclosed herein enable systems to perform repeatable and iterative load testing and performance benchmarking for artificial intelligence models deployed in a cloud computing environment. This is achieved by utilizing load profiles and representative workloads generated based on the load profiles to evaluate an artificial intelligence model under various workload contexts. The representative workload is then executed by the artificial intelligence model utilizing available computing infrastructure. Performance metrics are extracted from the execution and analyzed to provide insight into various performance dynamics such as the relationship between latency and data throughput. In addition, load profiles and input datasets are dynamically adjusted to evaluate different scenarios and use cases enabling the system to automatically test the artificial intelligence model across diverse applications. Furthermore, by comparing various iterations of the artificial intelligence
(Continued)

model, a quality gate can be constructed to enforce a consistent and high-quality user experience.

20 Claims, 11 Drawing Sheets

(58) Field of Classification Search
CPC ........... G06F 2209/508; G06F 11/3457; G06F 11/3414; G06N 3/0455
See application file for complete search history.

(56) References Cited

U.S. PATENT DOCUMENTS

| | | | |
|---|---|---|---|
| 2020/0007460 A1* | 1/2020 | Guim Bernat ........ | G06F 9/5072 |
| 2020/0104184 A1 | 4/2020 | Subramanian et al. | |
| 2020/0125545 A1* | 4/2020 | Idicula ................... | G06N 20/20 |
| 2020/0151551 A1 | 5/2020 | Zhang et al. | |
| 2020/0167258 A1* | 5/2020 | Chattopadhyay ... | G06F 11/3495 |
| 2020/0218985 A1* | 7/2020 | Wei ........................ | G06N 3/086 |
| 2021/0406086 A1* | 12/2021 | Shivanna ................ | G06F 9/505 |
| 2022/0012089 A1 | 1/2022 | Nasr-azadani et al. | |
| 2022/0188167 A1* | 6/2022 | Iyer ..................... | G06F 9/45558 |
| 2024/0103926 A1* | 3/2024 | Saxena ................... | H04L 67/56 |

OTHER PUBLICATIONS

Terko, et al., "Benchmark of Deep Learning models", Retrieved from: https://cds.cern.ch/record/2779288/files/Benchmark%20of%20Deep%20Learning%20models.pdf, Aug. 2021, 7 Pages.

Yeung, et al., "Towards GPU Utilization Prediction for Cloud Deep Learning", In Proceedings of the 12th USENIX Conference on Hot Topics in Cloud Computing, Oct. 4, 2021, 9 Pages.

International Search Report and Written Opinion received for PCT Application No. PCT/US2023/033419, Dec. 21, 2023, 17 pages.

Kistowski, et al., "Modeling and Extracting Load Intensity Profiles", IEEE/ACM 10th International Symposium on Software Engineering for Adaptive and Self-managing Systems, pp. 109-119, May 18, 2015.

International Preliminary Report on Patentability (Chapter 1) received for PCT Application No. PCT/US2023/033419, May 8, 2025, 10 pages.

* cited by examiner

| CONTAINER 204D N = 1 | CONTAINER 204D N = 2 | CONTAINER 204D N = 3 | CONTAINER 204D N = 4 | CONTAINER 204D N = 5 |
| CONTAINER 204C N = 1 | CONTAINER 204C N = 2 | CONTAINER 204C N = 3 | CONTAINER 204C N = 4 | CONTAINER 204C N = 5 |
| CONTAINER 204B N = 1 | CONTAINER 204B N = 2 | CONTAINER 204B N = 3 | CONTAINER 204B N = 4 | CONTAINER 204B N = 5 |
| CONTAINER 204A N = 1 | CONTAINER 204A N = 2 | CONTAINER 204A N = 3 | CONTAINER 204A N = 4 | CONTAINER 204A N = 5 |
| T1 | T2 | T3 | T4 | T5 |

TIME (T)

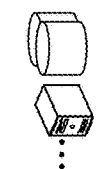

MODEL ENDPOINT 120

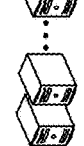

ASCENSION LOAD PROFILE 202

CONTAINERS (C) 204 = 4

THREADS (N) 206 = 1.5

INCREMENT 208 = 1

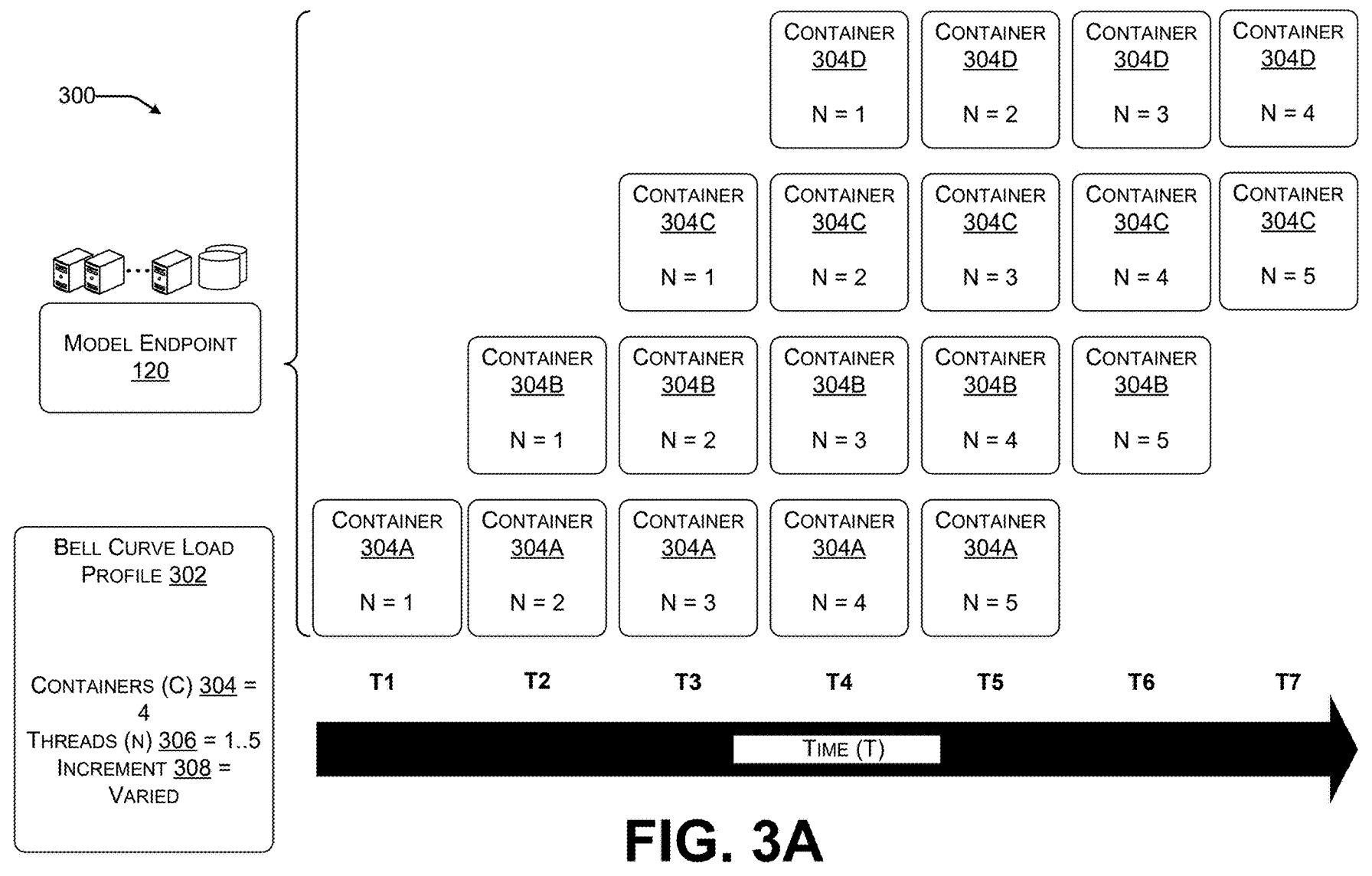

MODEL ENDPOINT
120

| | | | | | | |
|---|---|---|---|---|---|---|
| | | | CONTAINER 304D N = 1 | CONTAINER 304D N = 2 | CONTAINER 304D N = 3 | CONTAINER 304D N = 4 |
| | | CONTAINER 304C N = 1 | CONTAINER 304C N = 2 | CONTAINER 304C N = 3 | CONTAINER 304C N = 4 | CONTAINER 304C N = 5 |
| | CONTAINER 304B N = 1 | CONTAINER 304B N = 2 | CONTAINER 304B N = 3 | CONTAINER 304B N = 4 | CONTAINER 304B N = 5 | |
| CONTAINER 304A N = 1 | CONTAINER 304A N = 2 | CONTAINER 304A N = 3 | CONTAINER 304A N = 4 | CONTAINER 304A N = 5 | | |
| T1 | T2 | T3 | T4 | T5 | T6 | T7 |

TIME (T)

BELL CURVE LOAD PROFILE 302

CONTAINERS (C) 304 = 4

THREADS (N) 306 = 1.5

INCREMENT 308 = VARIED

FIG. 3A

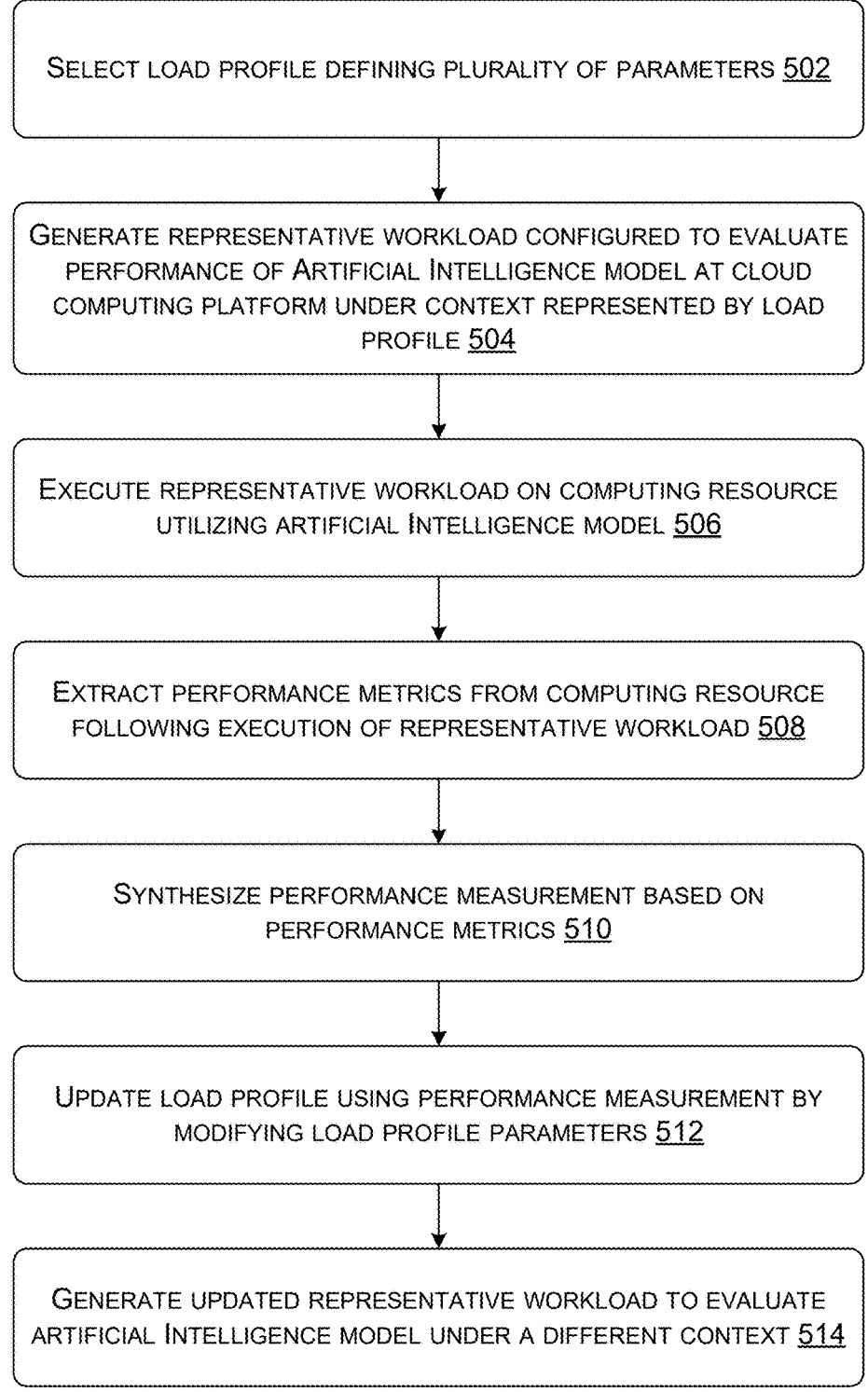

SELECT LOAD PROFILE DEFINING PLURALITY OF PARAMETERS 502

GENERATE REPRESENTATIVE WORKLOAD CONFIGURED TO EVALUATE PERFORMANCE OF ARTIFICIAL INTELLIGENCE MODEL AT CLOUD COMPUTING PLATFORM UNDER CONTEXT REPRESENTED BY LOAD PROFILE 504

EXECUTE REPRESENTATIVE WORKLOAD ON COMPUTING RESOURCE UTILIZING ARTIFICIAL INTELLIGENCE MODEL 506

EXTRACT PERFORMANCE METRICS FROM COMPUTING RESOURCE FOLLOWING EXECUTION OF REPRESENTATIVE WORKLOAD 508

SYNTHESIZE PERFORMANCE MEASUREMENT BASED ON PERFORMANCE METRICS 510

UPDATE LOAD PROFILE USING PERFORMANCE MEASUREMENT BY MODIFYING LOAD PROFILE PARAMETERS 512

GENERATE UPDATED REPRESENTATIVE WORKLOAD TO EVALUATE ARTIFICIAL INTELLIGENCE MODEL UNDER A DIFFERENT CONTEXT 514

LOAD TESTING AND PERFORMANCE BENCHMARKING FOR LARGE LANGUAGE MODELS USING A CLOUD COMPUTING PLATFORM

BACKGROUND

Recent years have seen the rapid growth in the capability and sophistication of artificial intelligence (AI) software applications. Accordingly, the computing demand for enabling advanced AI applications has grown dramatically as well. For instance, transformer-based AI models have seen widespread adoption due to their diverse processing capabilities in vision, speech, language, and decision making. Unlike other AI models such as recurrent neural networks and long short-term memory (LSTM) models, transformer-based AI models make use of a native self-attention mechanism to identify vague contexts and even synthesize new content (e.g., images, music). In some instances, some transformer-based models, also known as large language models, can comprise millions if not billions of individual parameters. To meet this demand, many organizations that provide large-scale computing infrastructure, such as cloud computing, offer AI platforms tailored to enabling users to train and deploy state of the art large language models.

Within an AI platform, a user can dynamically scale computing resources to suit their needs. For example, the user may scale resources vertically by selecting a more or less powerful computing instance (e.g., a virtual machine). Similarly, the user may scale resources horizontally by selecting the number of computing instances to deploy. From the perspective of the user, there are unlimited computing resources at their disposal to meet any demand. In reality, however, the available set of computing resources is finite and shared among multiple users.

To provide a consistent and high-quality user experience, AI platform providers must have an accurate measurement of the performance and capacity of the computing infrastructure as applied to the diverse workload contexts of a model environment. Furthermore, the service provider must also gain concrete visibility into the performance versus cost dynamic to operate the AI platform in a cost-effective manner. Without such insights, users may experience unacceptable performance degradation which can lead to negative impacts both technically at the computing infrastructure and financially as the provider expends time and engineering resources reacting to workload conditions.

SUMMARY

The techniques described herein provide systems for enhancing cloud computing platforms by introducing load testing and performance benchmarking for artificial intelligence models. This is accomplished by utilizing load profiles that represent various workload contexts to generate a representative workload. In various examples, the representative workload evaluates various performance characteristics of an artificial intelligence model for a cloud computing platform such as latency and data throughput in response to increased computing demand. In addition, representative workload executions can be configured to test diverse workload parameters including vector versus token outputs, streaming versus non-streaming output, cache size, and so forth.

As mentioned above, large language transformer-based models have seen widespread adoption in diverse application spaces such as summarization, text completion, classification, content synthesis, and the like. As such, large language models can be deployed in any number of configurations depending on the intended use case. For example, a large language model can be variably configured for throughput, a number of inputs and/or outputs (e.g., tokens), and/or workload scenarios. Consequently, it is unduly complex to accurately benchmark every possible configuration of a large language model. Moreover, large language models are oftentimes deployed as a live resource. That is, the amount of computing resource available can quickly grow or shrink based on demand.

To this end, the present disclosure addresses several technical challenges associated with deploying large language models using cloud computing platforms. For instance, utilizing load profiles to generate representative workloads enables the disclosed system to perform consistent and repeatable artificial intelligence model testing. In contrast, many existing solutions lack such a framework for evaluating artificial intelligence model performance. In addition, gathering well-defined insights regarding the performance impact of diverse factors such as computing demand, hardware infrastructure, and model configurations enables the service provider to guarantee users a concrete level of performance. Moreover, the performance testing enables the service provider to gain visibility into cost and performance dynamics thereby allowing the service provider to operate the cloud computing platform in a cost-effective manner.

In another example of the technical benefit of the present disclosure, the performance testing system as described herein further enables the cloud computing platform to construct a quality gate for comparing performance measurements across various iterations of an artificial intelligence model. In this way, the quality gate enables the system to uncover performance trends across iterations and anticipate the performance impact of future updates and workloads. Furthermore, the quality gate enables the system to establish a deployment criteria using regression metrics to ensure an ideal operational window for the cloud computing platform. Consequently, the quality gate prevents disruptions to the user experience and performance degradation over time.

Features and technical benefits other than those explicitly described above will be apparent from a reading of the following Detailed Description and a review of the associated drawings. This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, may refer to system(s), method(s), computer-readable instructions, module(s), algorithms, hardware logic, and/or operation(s) as permitted by the context described above and throughout the document.

BRIEF DESCRIPTION OF THE DRAWINGS

The Detailed Description is described with reference to the accompanying figures. In the figures, the left-most digit(s) of a reference number identifies the figure in which the reference number first appears. The same reference numbers in different figures indicate similar or identical items. References made to individual items of a plurality of items can use a reference number with a letter of a sequence of letters to refer to each individual item. Generic references to the items may use the specific reference number without the sequence of letters.

FIG. 2A illustrates a first example of a representative workload generated from a load profile representing a first context.

FIG. 3A illustrates a second example of a representative workload generated from a load profile representing a second context.

FIG. 5 is a flow diagram showing aspects of a routine for performing load testing and performance benchmarking for artificial intelligence models using a cloud computing platform.

DETAILED DESCRIPTION

Figure 1:
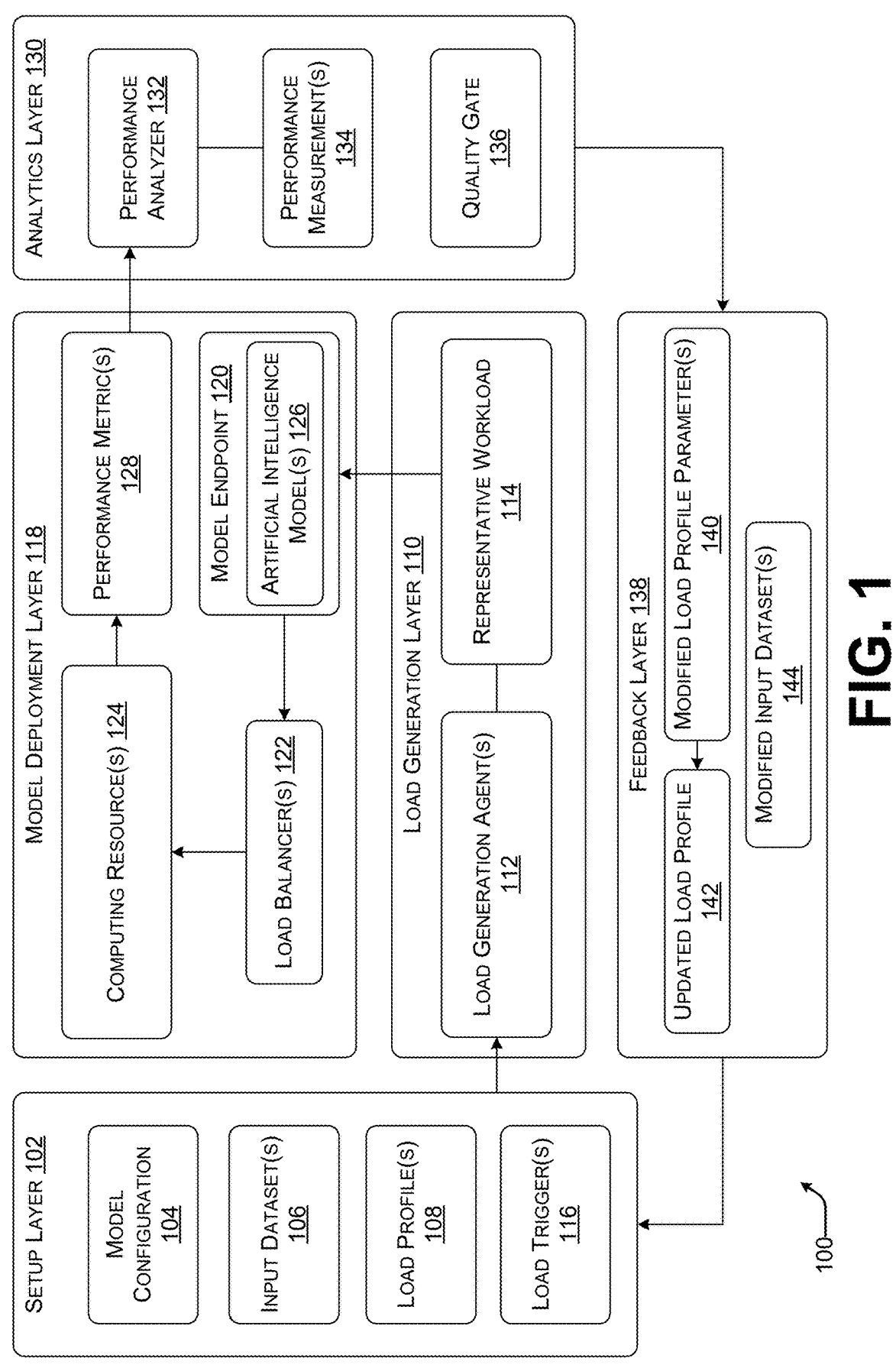
FIG. 1 is a block diagram of a system for performing load testing and performance benchmarking for artificial intelligence models using a cloud computing platform.

The techniques described herein enhance the operation of cloud computing platforms for deploying artificial intelligence models. While the examples discussed below are particularly relevant to large language transformer-based artificial intelligence models, also referred to herein as large language models, it should be understood that the disclosed system can be utilized in conjunction with any type of implementation of artificial intelligence (AI) such as neural networks. As mentioned above, as these models grow in capability and thus complexity, service providers must contend with similarly complex dynamics surrounding performance to ensure a high-quality and consistent user experience. For instance, modern large language models oftentimes comprise millions and even billions of parameters. As such, deploying and utilizing a large language model at a cloud computing platform can represent a major investment of computing resources. Accordingly, it is important to understand the performance impact of large language models.

However, load testing and performance benchmarking of large language models using traditional methods is time-consuming and impractical due to the number of possible permutations. Thus, there is a need for a system to automatically evaluate the diverse range of workload contexts that a cloud computing platform may encounter. This is accomplished through the use of load profiles that define parameters representing various workload contexts. In various examples, the load profile is selected from a predetermined set of load profiles as part of a setup layer. The setup layer is responsible for initializing necessary components for testing an artificial intelligence model such as input data, model configuration, and so forth. Alternatively, the load profile can be generated in a customized manner to test a specific workload context.

The selected load profile is then provided to a load generation layer which generates a representative workload according to the parameters defined by the load profile. In one example, the load profile defines a number of containers that comprise the representative workload and a number of threads for each container. In this way, the representative workload evaluates the ability of a cloud computing platform to accommodate load. In addition, the load generation layer can leverage the computing infrastructure of the cloud computing platform to generate the load. For instance, the representative workload can be generated by a Kubernetes cluster.

The representative workload is subsequently executed by an artificial intelligence model at a model deployment layer. In various examples, the model deployment layer is the computing hardware that comprises the cloud computing platform such as graphics processing units (GPUs), central processing units (CPUs), memory, and so forth. The model deployment layer also includes various infrastructure for supporting workload execution such as load balancers, and a user access point also known as an endpoint for receiving user inputs.

As the workload is executed by the artificial intelligence model, an analytics layer extracts various performance metrics from the model deployment layer. Alternatively, the analytics layer extracts the performance metrics after the artificial intelligence model is finished executing the representative workload (e.g., via a log file). In one example, the analytics layer is configured to track the latency of the artificial intelligence model in response to computing demand imposed by the representative workload. In another example, the analytics layer is configured to monitor data throughput in response to increasing demand. Moreover, the analytics layer can track multiple performance metrics simultaneously (e.g., latency and data throughput).

The analytics layer then synthesizes a performance measurement for the artificial intelligence model based on the performance metrics. As discussed below, the performance measurement can be expressed as a plotted curve (e.g., latency over demand). As multiple test runs are completed, the resulting performance measurements can be utilized to compare various iterations of the artificial intelligence model to provide insight into performance trends over time. For example, a service provider may deploy a new iteration of the artificial intelligence model each month. To prevent performance loss, the provider performs the load testing and performance benchmarking discussed herein and collects performance measurements for the new iteration of the artificial intelligence model. In this way, the new iteration can be objectively compared against the previous iteration of the artificial intelligence model.

Furthermore, the performance measurement is provided to a feedback layer for updating in preparation for another test run of the artificial intelligence model. The feedback layer accordingly modifies the input parameters or otherwise perturbs the selected load profile based on the performance measurement. In this way, the feedback layer generates an updated load profile using the originally selected load profile and the resulting performance measurement.

In one example, the originally selected load profile is configured to test a maximum computing demand the artificial intelligence model can accommodate. Following execution of the representative workload, the performance measurement shows that the artificial intelligence model did not experience a significant increase in latency, indicating that the load profile did not sufficiently stress the artificial intelligence model. In response, the feedback layer modifies the load profile to generate an updated representative workload. The updated representative workload places an increased computing demand on the artificial intelligence model to find an upper limit at which the artificial intelligence model experiences an unacceptable level of latency. In this way, the feedback layer enables the system to iteratively test different workload contexts through selecting a load profile as well as different permutations of a given workload context.

Various examples, scenarios, and aspects that enable load testing and performance benchmarking of artificial intelligence model are described below with respect to FIGS. 1-7.

FIG. 1 illustrates a system 100 that enables load testing and/or performance benchmarking for artificial intelligence models in cloud computing platforms. As shown in FIG. 1, a setup layer 102 is responsible for initializing a load test environment by selecting a model configuration 104, an input dataset 106, and a load profile 108. In various examples, the model configuration 104 defines various parameters of an artificial intelligence model that is to be deployed. For example, the model configuration 104 defines output type, cache size, the amount of available computing resources, and so forth. In addition, the model configuration 104 can also define a geographic region in which the artificial intelligence model is deployed as the location of a user relative to a cloud computing center can have an impact on latency.

The input datasets 106 are the data that the artificial intelligence model will process as part of the load test and/or performance benchmark. In various examples, the input datasets 106 include synthetic benchmark data sets which are large, publicly available datasets that enable consistent and repeatable testing. In this way, synthetic benchmark datasets allow the system 100 to fairly compare performance between different iterations of the artificial intelligence model as well as regression testing. The input datasets 106 can also include data from a live production environment that is directed to the test environment. Including live data enables the system 100 to evaluate the artificial intelligence model under realistic conditions (e.g., external users). Furthermore, portions of the live production data can be prepared specifically for the test environment. Stated another way, an input dataset 106 can be generated by configuring a portion of the live production data exhibiting a certain traffic pattern with a time series component. This enables the system 100 to evaluate different iterations of the artificial intelligence model using a consistent dataset representing realistic user activity.

The setup layer 102 then selects a load profile 108. As mentioned above, the load profile 108 defines various parameters of a representative workload comprising a set of containers which in turn comprise a set of threads. In addition, the load profile 108 also defines the level of concurrency of the representative workload. Stated alternatively, the load profile 108 defines the number of containers and threads that are active at a given time, which translates to computing demand. Accordingly, different load profiles can be selected to represent different workload contexts. A workload context is characterized by various factors such as workload type (e.g., text completion, classification, content generation), traffic pattern, peak computing demand, and so forth. For example, a first load profile defines a dramatic spike in computing demand representing a context in which a large number of users submit workloads at the same time. Conversely, a second load profile defines a smooth increase and subsequent decrease in computing demand representing a context in which the number of users accessing the cloud computing platform naturally grows and shrinks over the course of a day.

Following the initialization process of the setup layer 102, a load generation layer 110 utilizes a set of load generation agents 112 to generate a representative workload 114 according to the parameters defined by the load profile 108. In various examples, the generation of the representative workload 114 begins in response to a load trigger 116. The load trigger 116 can be a set of conditions that must be met before load generation can begin. For instance, the load generation agents 112 may be instances of a virtual machine that are each allocated a set of computing resources. Accordingly, the load trigger 116 is configured to wait until a threshold amount of computing resource is available before beginning generation of the representative workload 114.

As further elaborated on below, the representative workload 114 comprises a set of containers to simulate computing demand reaching a cloud computing platform from external users (e.g., customers). A container is a specialized software package containing the application code, libraries, and configuration components for enabling an application to execute in a standalone environment. Moreover, each container can itself comprise several software threads. The number of containers and threads active at a given time is defined by the load profile. In this way, the concurrency (i.e., computing demand) is well-defined and enables the system 100 to perform consistent and repeatable load testing and/or performance benchmarking.

Once the representative workload 114 is generated by the load generation agents 112, the representative workload 114 is dispatched to a model deployment layer 118 for execution. As shown, the representative workload 114 is received by a model endpoint 120. In various examples, the model endpoint 120 is the component which enables a user to interact with the cloud computing platform. For instance, the representative workload 114 is formatted as a hypertext transfer protocol (HTTP) request which is transmitted over a network to the model endpoint 120. The request is then analyzed and validated before being routed within the model deployment layer 118 to a load balancer 122 for dispatch to computing resources 124. In addition, the model endpoint 120 can be configured to scale in response to the volume of incoming requests. Furthermore, the model endpoint 120 also handles communication between the model deployment layer 118 and the source of the request (e.g., a user).

The computing resources 124 are any computing hardware that facilitates the execution of the representative workload 114 via a graphics processing units (GPUs), central processing units (CPUs), memory, storage, and so forth. As mentioned above, the model endpoint 120 consists of an artificial intelligence model 126. In various examples, the artificial intelligence model 126 can be a large language transformer-based model that is deployed via the model config 104. This utilizes the computing resources 124 to process the representative workload 114. Stated another way, some, or all of the representative workload 114 is scheduled to the computing resources 124 for execution by the artificial intelligence model 126 available at the model endpoint 120.

During execution of the representative workload 114 by the artificial intelligence model 126 deployed in the model deployment layer 118 and/or after the representative workload 114 is executed by the computing resources 124, various performance metrics 128 are extracted from the artificial intelligence model 126 and/or the computing resource 124. The performance metrics 128 contain service logs, outputs from the artificial intelligence model 126, and any other data resulting from the representative workload 114. Aggregations and other analysis can be performed on the performance metrics 128 to gain insight into the behavior and/or performance of the artificial intelligence model 126 within the context embodied by the representative workload 114.

This is the responsibility of the analytics layer 130 which extracts the performance metrics 128 from the model deployment layer 118. Utilizing a performance analyzer 132, the analytics layer 130 aggregates the raw data from the performance metrics 128. In addition, the performance analyzer 132 can be configured with a specified granularity to enable trend analysis, data summarization, and other performance analysis techniques. For instance, the performance metrics 128 can include data throughput, latency, and other indicators of performance. Accordingly, the performance analyzer 132 can generate performance measurements 134 based on the performance metrics 128 to capture behaviors of the artificial intelligence model 126 in response to the representative workload 114. A performance measurement 134 is any data formatted to express and quantify the performance of the current configuration of the artificial intelligence model 126 and/or the computing resources 124. In one example, the performance measurement 134 is a plot expressing the relationship between latency and data throughput.

In addition to the performance measurement 134, the analytics layer 130 can also be configured to generate a quality gate 136. As discussed below, the quality gate 136 is generated based on a comparison of performance measurements 134 for multiple iterations of the artificial intelligence model 126. In an illustrative example, a cloud service provider develops and releases an update for the artificial intelligence model 126 once a month. Prior to actually releasing the update, however, the service provider evaluates the update using the process shown and discussed with respect to FIG. 1. In addition, the update can be evaluated alongside previous iterations of the artificial intelligence model 126 as a regression test. As such, the multiple iterations of the artificial intelligence model 126 can be deployed simultaneously at the computing resources 124 for the regression test.

Based on the regression testing, the analytics layer 130 generates a quality gate 136 that defines an operational window comprising one or several performance thresholds that must be met before an iteration of the artificial intelligence model 126 can be deployed. In one example, the quality gate 136 defines a maximum acceptable latency for a level of given data throughput. Furthermore, the quality gate can be used to select one iteration of the artificial intelligence model 126 that is selected from the model configuration 104 to deploy from a plurality of candidate iterations. It should be understood that an iteration can also be referred to as a build or version with respect to a piece of software such as the artificial intelligence model 126.

To complete the iterative loop, a feedback layer 138 reviews the results of the analytics layer 130 such as the performance measurements 134. Accordingly, the feedback layer 138 generates a set of modified load profile parameters 140 based on the performance measurements 134 resulting in an updated load profile 142. In addition, the feedback layer 138 can generate a modified input dataset 144. Through the updated load profile 142 and the modified input dataset 144, the feedback layer 138 enables the system 100 to run updated representative workloads 114 to evaluate the performance of the artificial intelligence model 126 under different scenarios and/or contexts.

As mentioned above, large language models have seen adoption for a wide variety of uses such as summarization, text completion, document retrieval and search, classification, translation, prompt-based content generation, and so forth. Each of these uses involves a general workflow comprising receiving an input and/or context token to which the artificial intelligence model 126 applies a series of feedforward pass calculations to derive a set of output tokens. It is well understood that the size of the input and/or context token, the intended task, and the model configuration 104 impact the size of the output tokens and the time required to derive the output tokens. Moreover, the number of requests per second (i.e., demand) determines the data throughput and affects latency for a given workload. As such, evaluating as many different contexts as possible is an important consideration when testing an artificial intelligence model 126.

By generating modified load profiles 142 and modified input datasets 144, the feedback layer 138 enables several uses and technical benefits. In one example, the system 100 can investigate the impact of workload size on the performance of the artificial intelligence model 126. In another example, the feedback layer 138 identifies workload types that interact well and can thus be processed by the same artificial intelligence model 126 and/or computing resources 124. For instance, an artificial intelligence model 126 that primarily processes summarization workloads may handle text completion workloads well. Conversely, the same artificial intelligence model 126 may suffer performance degradation in image generation workloads. In this way, the system 100 can determine an optimal workload scheduling for a given set of computing resources 124. Furthermore, the system 100 can perform custom tuning of the artificial intelligence model 126 to maximize efficiency for available computing capacity.

In still another example, the feedback layer 138 can identify load thresholds at which a given workload must be directed to new and/or additional computing resources 124 for proper processing often known as a failover. In typical scenarios, a failover is a high severity issue requiring significant effort to address. By identifying concrete load thresholds at which a failover is likely to occur, the system 100 can gracefully handle a failover. For instance, by automatically managing the workload and/or by issuing an advance warning to a system administrator or engineer. In still another example, by iteratively modifying and testing input datasets 106 and load profiles 108, the system 100 can identify various tiers of customer experience to offer users. For example, a user paying for a premium subscription to the cloud computing platform may receive lower latencies at higher data throughputs than a free user.

Turning now to FIG. 2A, an example of a load profile 108 is shown and described. Specifically, FIG. 2A illustrates an example of an ascension load profile 202. An ascension load profile 202 generates load through concurrently active containers 204A-204D that each comprise a set of threads 206. The ascension load profile 202 follows an arithmetic sequence with computing demand increasing over time. In many examples, the total demand exerted by a load profile 108 can be expressed using the following equation (1):

$$TC_t = \sum_{t=1}^{T}(N*C) \qquad (1)$$

In equation (1), $TC_t$ is the total demand, T is the time, n is the number of threads and C is the number of containers.

An ascension load profile 202 is useful for determining a maximum level of computing demand a set of computing resources 124 utilizing an artificial intelligence model 126 can handle before encountering excessive latency degradation. For example, as shown in FIG. 2A, the ascension load profile 202 defines a representative workload 114 comprising four containers 204. Accordingly, each container 204 increases its number of threads 206 by a predefined increment 208 at each time step T. For example, at time Ti, each container 204 contains one thread 206 and increases by an increment 208 of one for each time step. As a result, each container 204A-204D contains five threads 206 at time T5.

Figure 2B:
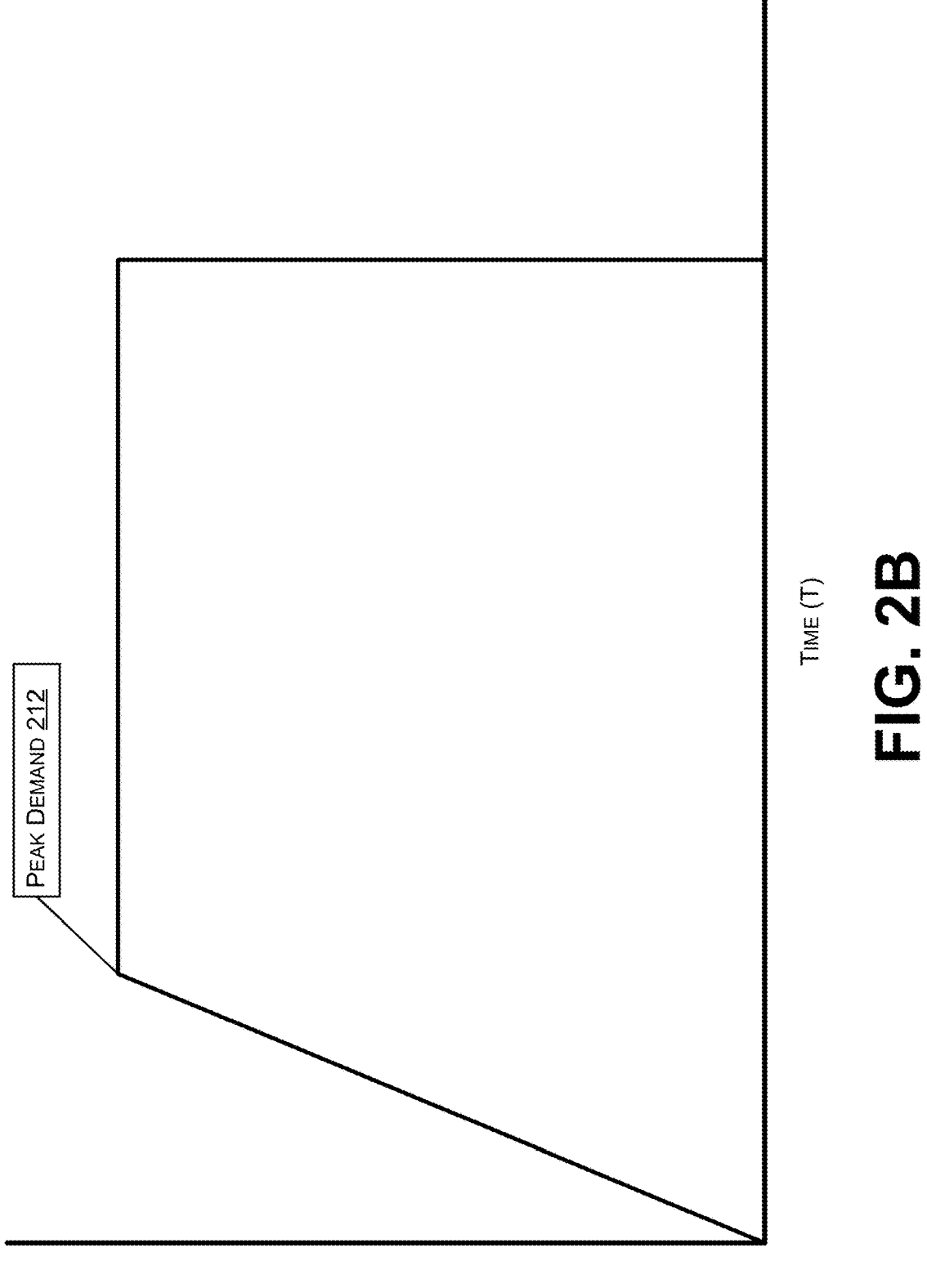
FIG. 2B illustrates a computing demand resulting from the first example of the representative workload as captured in FIG. 2A.

As shown in FIG. 2B, the computing demand 210 imposed by the ascension load profile 202 of FIG. 2A rapidly reaches a peak demand 212 imposed on the computing resources 124 and the artificial intelligence model 126, which instantaneously returns to zero as the representative workload 114 completes. By utilizing the feedback layer 138 discussed above, the peak demand 212 can be iteratively adjusted.

Turning to FIG. 3A, another example of a load profile 108 is shown and discussed. In this example, a bell curve load profile 302 is illustrated. Similar to the ascension load profile 202 above, the bell curve load profile 302 defines a number of containers 304 and a number of threads 306 for each container 304. Unlike the ascension load profile 202 however, the containers 304 are staggered with respect to time T That is, the time T at which a first container 304A reaches the model endpoint 120 and begins increasing demand is different from a second container 304B. Moreover, the increment 308 for each container varies as some containers 304 are finished executing while other containers 304 are still ramping up their respective number of threads 306.

Figure 3B:
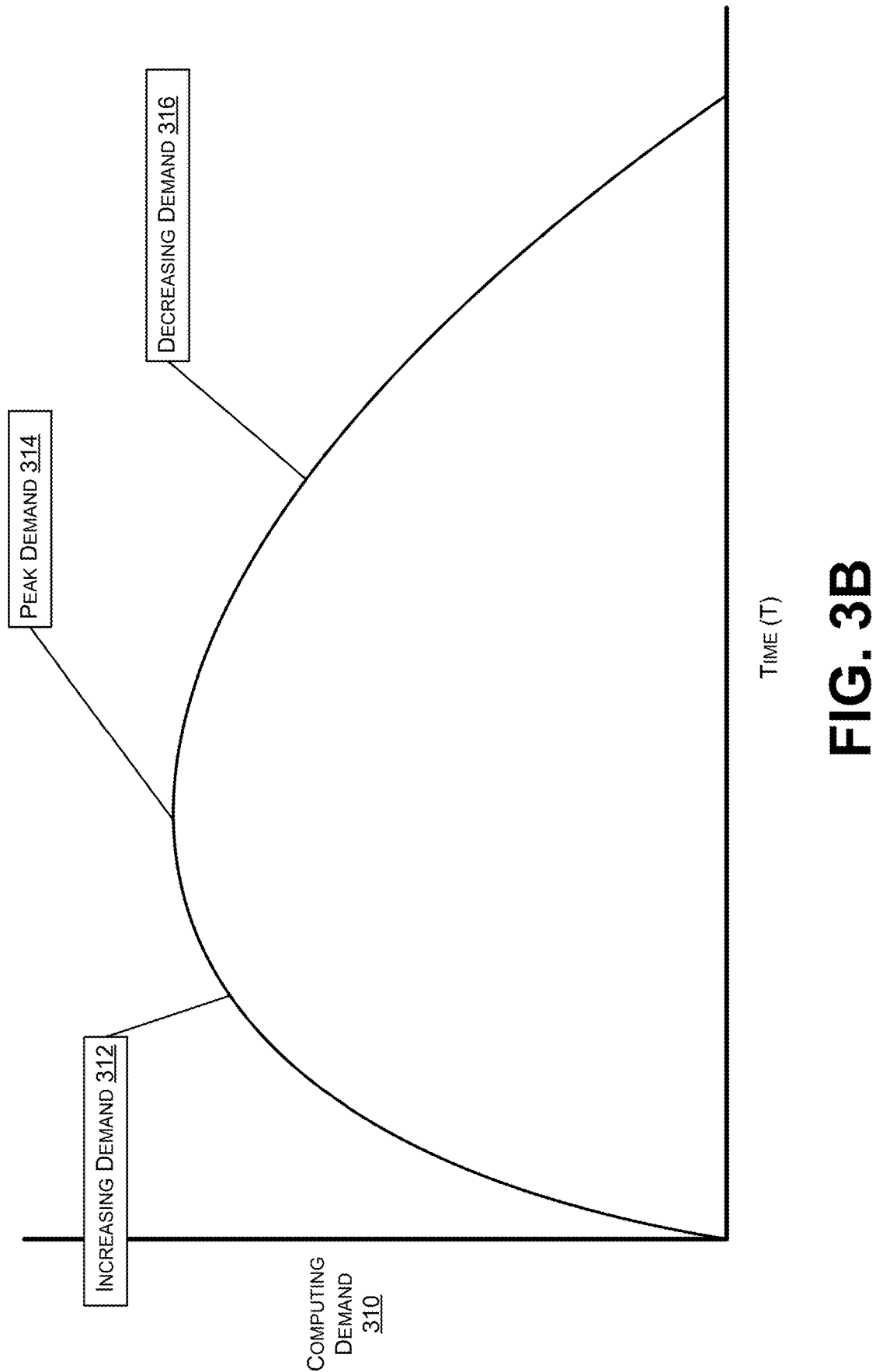
FIG. 3B illustrates a computing demand resulting from the second example of the representative workload as captured in FIG. 3A.

As shown in FIG. 3B, staggering the containers 304 as discussed causes the computing demand 310 to exhibit a different behavior from the ascension load profile 202 by first going through a period of increasing demand 312 before reaching a peak demand 314 and a subsequent period of decreasing demand 316. Similar to the ascension load profile 202, the computing demand 310 for the bell curve load profile 302 can be adjusted by the feedback layer 138. For example, adjusting the number of threads 306 results in a different peak demand 314. For instance, an increased number of threads results in an increased peak demand 314. In addition, adjusting the number of containers 304 changes the duration of the computing demand accordingly.

Figure 4A:
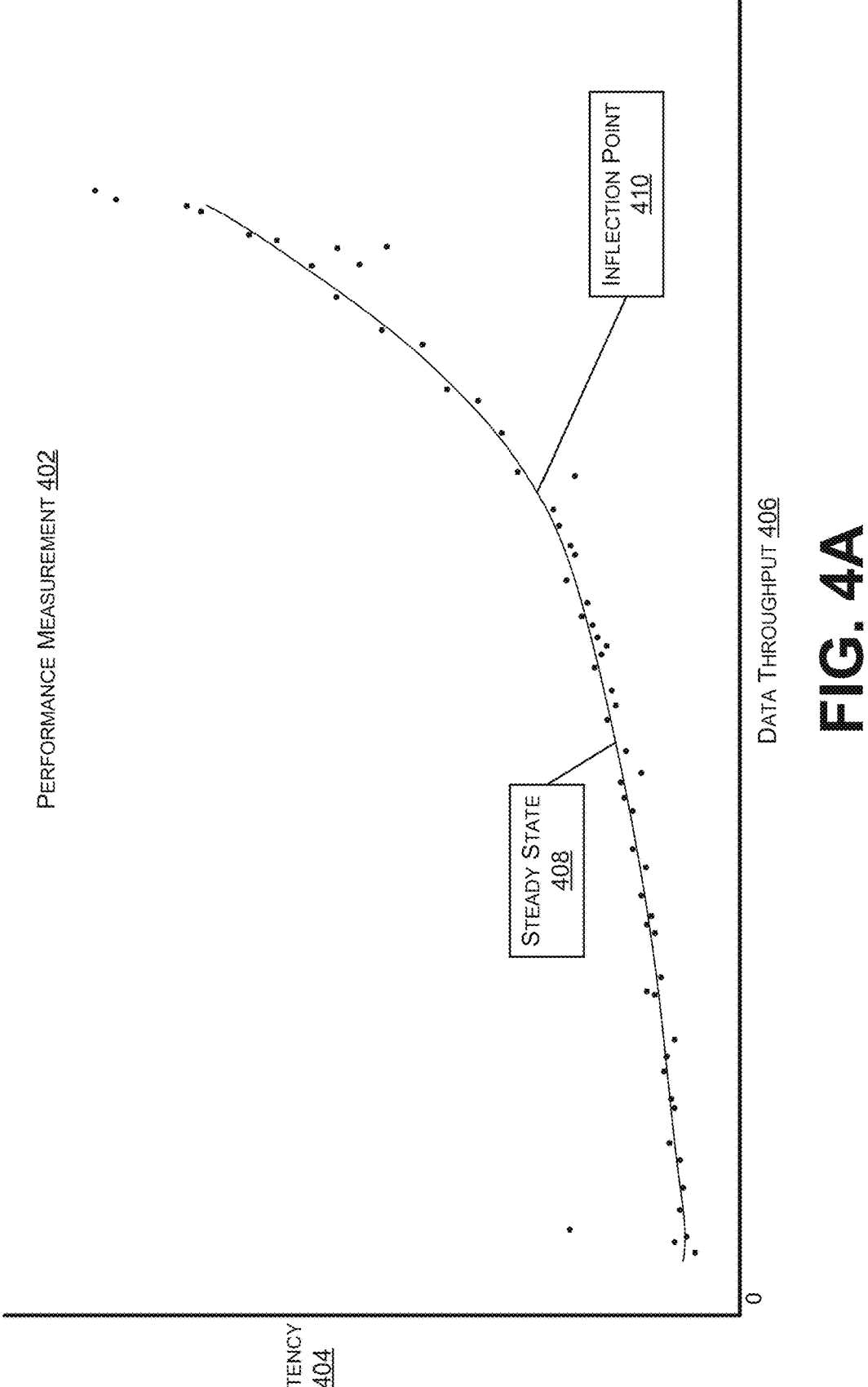
FIG. 4A illustrates a first example of a performance measurement resulting from execution of a representative workload.

Proceeding to FIG. 4A, a performance measurement 402 synthesized from an execution of a representative workload 114 is shown and described. As discussed above, the analytics layer 130 can perform analysis on performance metrics 128 extracted from the model deployment layer 118 to gain insight into model behavior under the conditions of the representative workload 114. One example of a performance measurement 402 is visualizing the relationship between latency 404 and data throughput 406. Logically, as data throughput 406 increases so too does latency 404. By objectively visualizing this relationship, the performance measurement 402 enables a service provider to identify operating conditions that provide an optimal balance between various performance metrics 128.

There are some areas of the latency 404 versus data throughput 406 relationship that are of particular interest to a service provider. Firstly, the performance measurement 402 identifies a steady state 408 in which the computing resources 124 and associated artificial intelligence models 126 maintain consistent data throughput 406 without an appreciable increase in latency 404. Under normal circumstances, the service provider can expect most workloads to reside in the steady state 408 where failure rates are comparatively low for a given level of data throughput 406. Hence, the steady state 408 can be considered a "happy state" indicating an optimal range of performance and/or a most desirable user experience.

Secondly, the performance measurement 402 identifies an inflection point 410 at which the computing resources 124 are heavily utilized and latency begins to increase significantly. Beyond the inflection point 410, there is an exponential increase in latency 404 for relatively little gain in data throughput 406. In the event the computing resources 124 for an artificial intelligence model 126 reach the inflection point 410, an automatic resource scaling process is triggered. Stated another way, the inflection point 410 defines a threshold latency 404 and data throughput 406 at which additional computing resources 124 are assigned to the artificial intelligence model 126 for processing various workloads. Furthermore, the inflection point 410 can also be referred to as an "elbow state", indicating a zone of data throughput 406 at which the latency 404 increases exponentially.

Figure 4B:
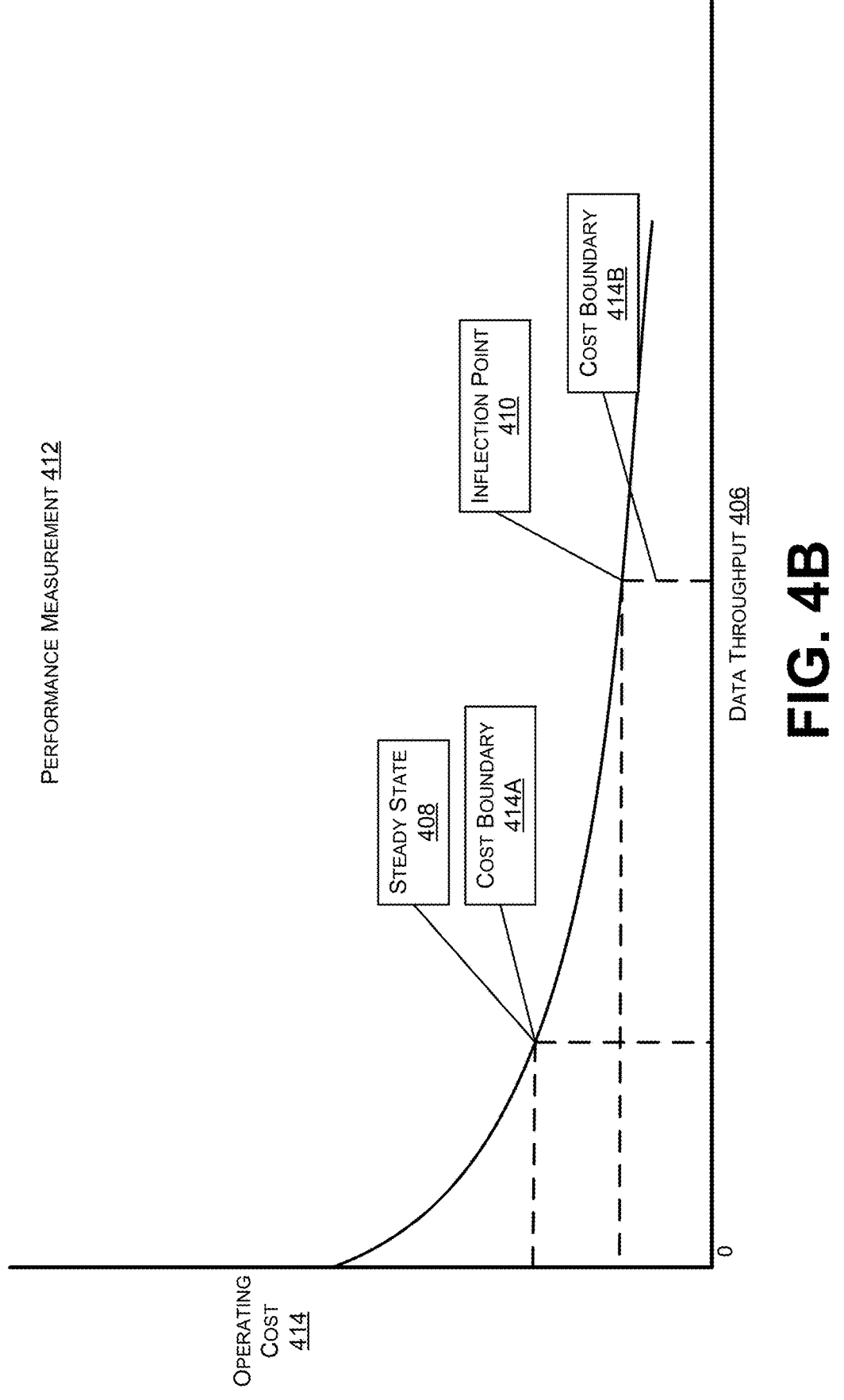
FIG. 4B illustrates a comparison of artificial intelligence model performance against operating cost.

Turning now to FIG. 4B, another example of a performance measurement 412 is shown and described. The performance measurement 412 visualizes a relationship between an operating cost 414 associated with operating a cloud computing platform and data throughout 406. In various examples, the performance measurement 412 is derived from the performance measurement 402 expressing latency 404 versus data throughput 406. Accordingly, the performance measurement 412 includes the steady state 408 and inflection point 410 identified by the previous performance measurement 402. By plotting the operating cost 414 against the data throughput 406, the performance measurement 412 identifies various cost boundaries 414A and 414B.

The first cost boundary 414A is associated with the steady state 408. As mentioned above, the steady state 408 represents a most desirable user experience as the latency 404 is minimized for a relatively high data throughput 406. However, the operating cost 414 at the first cost boundary 414A is higher in relation to the second cost boundary 414B as low latency 404 requires low utilization of the computing resources 124. In contrast, the second cost boundary 414B at the inflection point 410 is lower as utilization of the computing resources 124 increases. In this way, the performance measurement 412 can enable a service provider to intelligently price cloud computing services on a performance basis for various users (e.g., customers). There is leverage that can be tuned here as the cost associated with the computing resource is inversely proportional to the desired throughput along this cost curve until a point at which it hits a plateau.

Figure 4C:
FIG. 4C illustrates a performance measurement comparison between various iterations of an artificial intelligence model.

Turning now to FIG. 4C, a comparison between performance measurements 416A-416C is shown and described. As discussed above, the system 100 enables consistent and repeatable load testing and/or performance benchmarking. Accordingly, multiple iterations of an artificial intelligence model 418A-418C can be compared against each other in a fair and representative manner. This enables a service provider to select the most ideal artificial intelligence model iteration 418 for deployment to users. As shown in FIG. 4C, a latency 420 for each artificial intelligence model iteration 418 is plotted against a normalized data throughput 422 to ensure a fair performance comparison.

From a comparison of the performance measurements 416A-416C, it is determined that the artificial intelligence model 418B exhibits the most desirable behavior as the normalized data throughput 422 increases. The performance measurement 416B experiences an inflection point 424 at a comparatively greater normalized data throughput 422 than the performance measurements 416A and 416C. Moreover, the performance measurement 416B also experiences comparatively less severe degradation in latency 420 after the inflection point 424. Accordingly, the artificial intelligence model iteration 418B is selected from the candidate artificial intelligence model iterations 418A-418C for deployment.

In addition, as mentioned above, comparing performance measurements 416A-416C for various artificial intelligence model iterations 418A-418C enables the system 100 to construct a quality gate 136 based on performance trends across iterations, behavior tendencies under various representative workloads 114, and other factors. For instance, the quality gate 136 defines a threshold latency 420 for a certain normalized data throughput 422. Accordingly, artificial intelligence model iterations 418 that exceed the threshold latency are prevented from being deployed to users.

Turning now to FIG. 5, aspects of a routine 500 for enabling load testing and/or performance benchmarking for large language models using a cloud computing platform is shown and described. With reference to FIG. 5, the routine 500 begins at operation 502, where a system selects a load profile, the load profile defining a plurality of workload parameters.

Next, at operation 504, the system generates a representative workload according to the parameters defined by the load profile. The representative workload is configured to evaluate the performance of the artificial intelligence model for the cloud computing platform under a context represented by the load profile.

Then, at operation 506, the system executes the representative workload on a computing resource utilizing the artificial intelligence model.

Next, at operation 508, the system extracts a plurality of performance metrics from the computing resource following execution of the representative workload on the computing resource utilizing the artificial intelligence model.

Subsequently, at operation 510, the system synthesizes a performance measurement based on the plurality of performance metrics.

Then, at operation 512, the load profile is updated using the performance measurement by modifying the plurality of parameters defined by the load profile.

Finally, at operation 514, the system generates an updated representative workload configured to further evaluate the performance of the artificial intelligence model of the cloud computing platform under a different context.

For ease of understanding, the processes discussed in this disclosure are delineated as separate operations represented as independent blocks. However, these separately delineated operations should not be construed as necessarily order dependent in their performance. The order in which the process is described is not intended to be construed as a limitation, and any number of the described process blocks may be combined in any order to implement the process or an alternate process. Moreover, it is also possible that one or more of the provided operations is modified or omitted.

The particular implementation of the technologies disclosed herein is a matter of choice dependent on the performance and other requirements of a computing device. Accordingly, the logical operations described herein are referred to variously as states, operations, structural devices, acts, or modules. These states, operations, structural devices, acts, and modules can be implemented in hardware, software, firmware, in special-purpose digital logic, and any combination thereof. It should be appreciated that more or fewer operations can be performed than shown in the figures and described herein. These operations can also be performed in a different order than those described herein.

It also should be understood that the illustrated methods can end at any time and need not be performed in their entireties. Some or all operations of the methods, and/or substantially equivalent operations, can be performed by execution of computer-readable instructions included on a computer-storage media, as defined below. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof.

For example, the operations of the routine 500 can be implemented, at least in part, by modules running the features disclosed herein can be a dynamically linked library (DLL), a statically linked library, functionality produced by an application programing interface (API), a compiled program, an interpreted program, a script, or any other executable set of instructions. Data can be stored in a data structure in one or more memory components. Data can be retrieved from the data structure by addressing links or references to the data structure.

Although the illustration may refer to the components of the figures, it should be appreciated that the operations of the routine 500 may be also implemented in other ways. In addition, one or more of the operations of the routine 500 may alternatively or additionally be implemented, at least in part, by a chipset working alone or in conjunction with other software modules. In the example described below, one or more modules of a computing system can receive and/or process the data disclosed herein. Any service, circuit, or application suitable for providing the techniques disclosed herein can be used in operations described herein.

Figure 6:
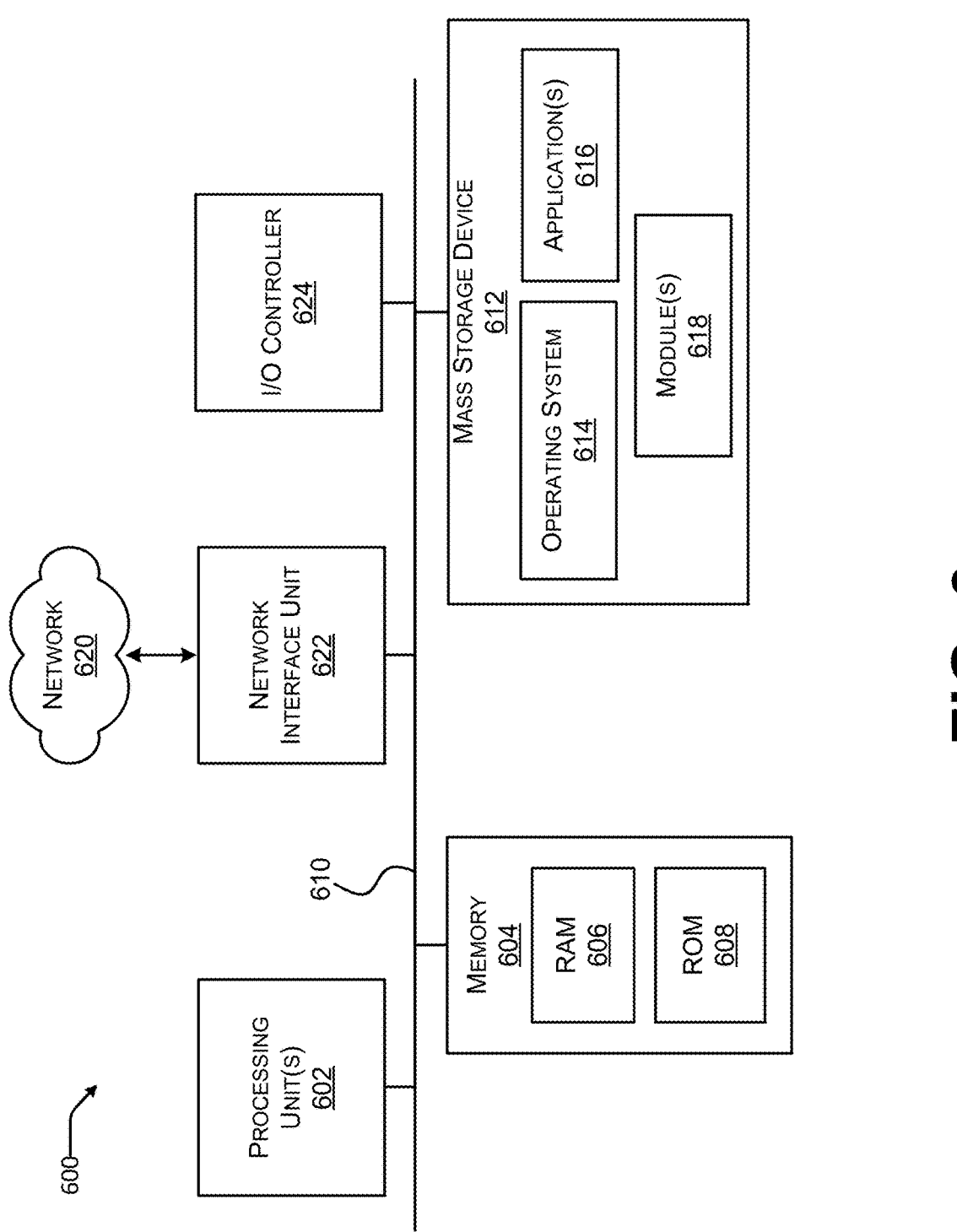
FIG. 6 is a computer architecture diagram illustrating an illustrative computer hardware and software architecture for a computing system capable of implementing aspects of the techniques and technologies presented herein.

FIG. 6 shows additional details of an example computer architecture 600 for a device, such as a computer or a server configured as part of the cloud-based platform or system 100, capable of executing computer instructions (e.g., a module or a program component described herein). The computer architecture 600 illustrated in FIG. 6 includes processing system 602, a system memory 604, including a random-access memory 606 (RAM) and a read-only memory (ROM) 608, and a system bus 610 that couples the memory 604 to the processing system 602. The processing system 602 comprises processing unit(s). In various examples, the processing unit(s) of the processing system 602 are distributed. Stated another way, one processing unit of the processing system 602 may be located in a first location (e.g., a rack within a datacenter) while another processing unit of the processing system 602 is located in a second location separate from the first location.

Processing unit(s), such as processing unit(s) of processing system 602, can represent, for example, a CPU-type processing unit, a GPU-type processing unit, a field-programmable gate array (FPGA), another class of digital signal processor (DSP), or other hardware logic components that may, in some instances, be driven by a CPU. For example, illustrative types of hardware logic components that can be used include Application-Specific Integrated Circuits (ASICs), Application-Specific Standard Products (ASSPs), System-on-a-Chip Systems (SOCs), Complex Programmable Logic Devices (CPLDs), and the like.

A basic input/output system containing the basic routines that help to transfer information between elements within the computer architecture 600, such as during startup, is stored in the ROM 608. The computer architecture 600 further includes a mass storage device 612 for storing an operating system 614, application(s) 616, modules 618, and other data described herein.

The mass storage device 612 is connected to processing system 602 through a mass storage controller connected to the bus 610. The mass storage device 612 and its associated computer-readable media provide non-volatile storage for the computer architecture 600. Although the description of computer-readable media contained herein refers to a mass storage device, the computer-readable media can be any available computer-readable storage media or communication media that can be accessed by the computer architecture 600.

Computer-readable media includes computer-readable storage media and/or communication media. Computer-readable storage media includes one or more of volatile memory, nonvolatile memory, and/or other persistent and/or auxiliary computer storage media, removable and non-removable computer storage media implemented in any method or technology for storage of information such as computer-readable instructions, data structures, program modules, or other data. Thus, computer storage media includes tangible and/or physical forms of media included in a device and/or hardware component that is part of a device or external to a device, including RAM, static RAM (SRAM), dynamic RAM (DRAM), phase change memory (PCM), ROM, erasable programmable ROM (EPROM), electrically EPROM (EEPROM), flash memory, compact disc read-only memory (CD-ROM), digital versatile disks (DVDs), optical cards or other optical storage media, magnetic cassettes, magnetic tape, magnetic disk storage, magnetic cards or other magnetic storage devices or media, solid-state memory devices, storage arrays, network attached storage, storage area networks, hosted computer storage or any other storage memory, storage device, and/or storage medium that can be used to store and maintain information for access by a computing device.

In contrast to computer-readable storage media, communication media can embody computer-readable instructions, data structures, program modules, or other data in a modulated data signal, such as a carrier wave, or other transmission mechanism. As defined herein, computer storage media does not include communication media. That is, computer-readable storage media does not include communications media consisting solely of a modulated data signal, a carrier wave, or a propagated signal, per se.

According to various configurations, the computer architecture 600 may operate in a networked environment using logical connections to remote computers through the network 620. The computer architecture 600 may connect to the network 620 through a network interface unit 622 connected to the bus 610. The computer architecture 600 also may include an input/output controller 624 for receiving and processing input from a number of other devices, including a keyboard, mouse, touch, or electronic stylus or pen. Similarly, the input/output controller 624 may provide output to a display screen, a printer, or other type of output device.

The software components described herein may, when loaded into the processing system 602 and executed, transform the processing system 602 and the overall computer architecture 600 from a general-purpose computing system into a special-purpose computing system customized to facilitate the functionality presented herein. The processing system 602 may be constructed from any number of transistors or other discrete circuit elements, which may individually or collectively assume any number of states. More specifically, the processing system 602 may operate as a finite-state machine, in response to executable instructions contained within the software modules disclosed herein. These computer-executable instructions may transform the processing system 602 by specifying how the processing system 602 transition between states, thereby transforming the transistors or other discrete hardware elements constituting the processing system 602.

Figure 7:
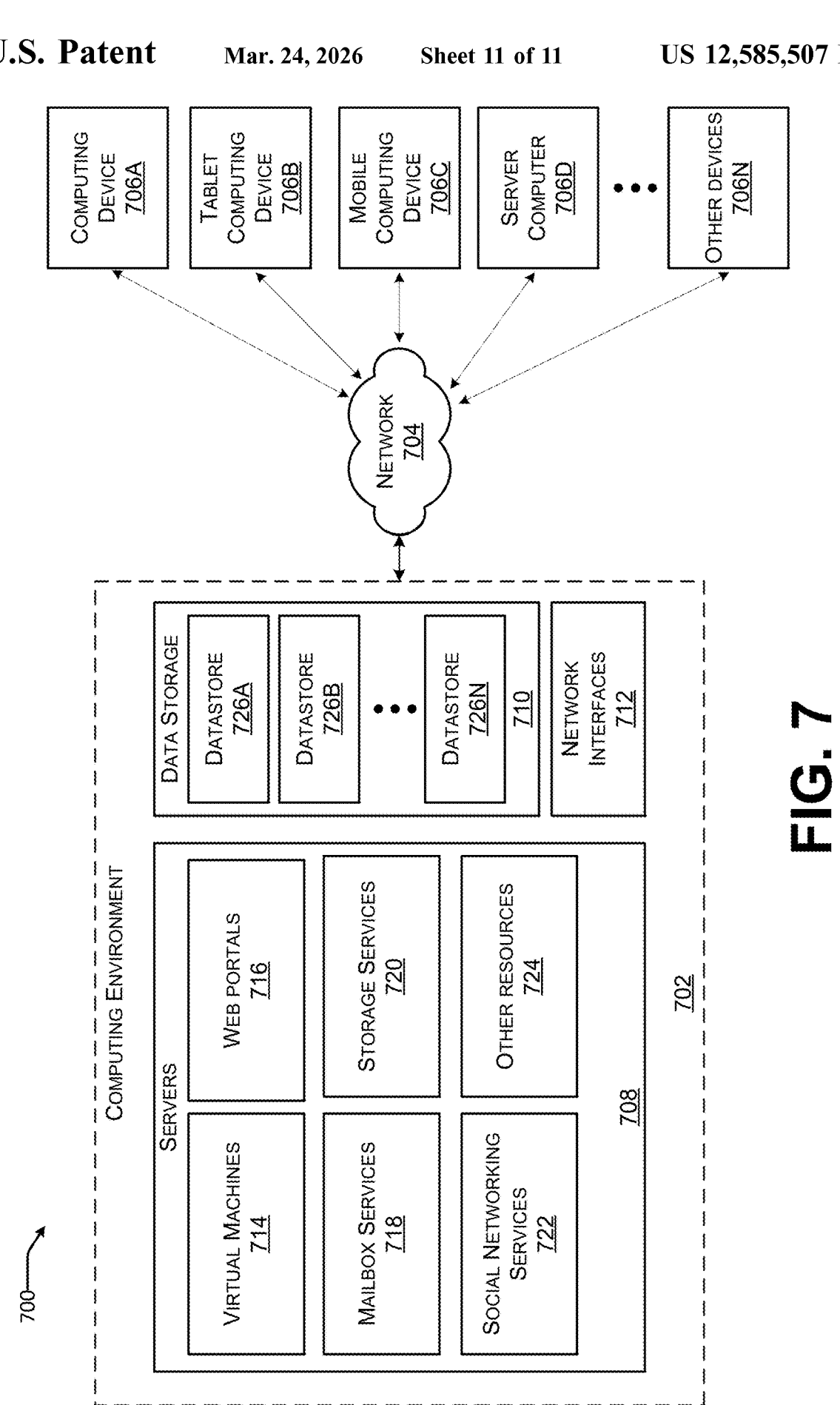
FIG. 7 is a diagram illustrating a distributed computing environment capable of implementing aspects of the techniques and technologies presented herein.

FIG. 7 depicts an illustrative distributed computing environment 700 capable of executing the software components described herein. Thus, the distributed computing environment 700 illustrated in FIG. 7 can be utilized to execute any aspects of the software components presented herein. For example, the distributed computing environment 700 can be utilized to execute aspects of the software components described herein. Accordingly, the distributed computing environment 700 can include a computing environment 702 operating on, in communication with, or as part of the network 704. The network 704 can include various access networks. One or more client devices 706A-706N (hereinafter referred to collectively and/or generically as "computing devices 706") can communicate with the computing environment 702 via the network 704. In one illustrated configuration, the computing devices 706 include a computing device 706A such as a laptop computer, a desktop computer, or other computing device; a slate or tablet computing device ("tablet computing device") 706B; a mobile computing device 706C such as a mobile telephone, a smart phone, or other mobile computing device; a server computer 706D; and/or other devices 706N. It should be understood that any number of computing devices 706 can communicate with the computing environment 702.

In various examples, the computing environment 702 includes servers 708, data storage 610, and one or more network interfaces 712. The servers 708 can host various services, virtual machines, portals, and/or other resources. In the illustrated configuration, the servers 708 host virtual machines 714, Web portals 716, mailbox services 718, storage services 720, and/or social networking services 722.

As shown in FIG. 7 the servers 708 also can host other services, applications, portals, and/or other resources ("other resources") 724.

As mentioned above, the computing environment 702 can include the data storage 710. According to various implementations, the functionality of the data storage 710 is provided by one or more databases operating on, or in communication with, the network 704. The functionality of the data storage 710 also can be provided by one or more servers configured to host data for the computing environment 700. The data storage 710 can include, host, or provide one or more real or virtual datastores 726A-726N (hereinafter referred to collectively and/or generically as "datastores 726"). The datastores 726 are configured to host data used or created by the servers 808 and/or other data. That is, the datastores 726 also can host or store web page documents, word documents, presentation documents, data structures, algorithms for execution by a recommendation engine, and/or other data utilized by any application program. Aspects of the datastores 726 may be associated with a service for storing files.

The computing environment 702 can communicate with, or be accessed by, the network interfaces 712. The network interfaces 712 can include various types of network hardware and software for supporting communications between two or more computing devices including the computing devices and the servers. It should be appreciated that the network interfaces 712 also may be utilized to connect to other types of networks and/or computer systems.

It should be understood that the distributed computing environment 700 described herein can provide any aspects of the software elements described herein with any number of virtual computing resources and/or other distributed computing functionality that can be configured to execute any aspects of the software components disclosed herein. According to various implementations of the concepts and technologies disclosed herein, the distributed computing environment 700 provides the software functionality described herein as a service to the computing devices. It should be understood that the computing devices can include real or virtual machines including server computers, web servers, personal computers, mobile computing devices, smart phones, and/or other devices. As such, various configurations of the concepts and technologies disclosed herein enable any device configured to access the distributed computing environment 700 to utilize the functionality described herein for providing the techniques disclosed herein, among other aspects.

The disclosure presented herein also encompasses the subject matter set forth in the following clauses.

Example Clause A, a method for evaluating a performance of an artificial intelligence model for a cloud computing platform, the method comprising: selecting a load profile defining a plurality of parameters; generating a representative workload configured to evaluate the performance of the artificial intelligence model for the cloud computing platform under a computing demand imposed by a workload context represented by the load profile; executing the representative workload on a computing resource utilizing the artificial intelligence model; extracting a plurality of performance metrics from the computing resource following execution of the representative workload on the computing resource utilizing the artificial intelligence model; synthesizing a performance measurement based on the plurality of performance metrics extracted from the computing resource; updating the load profile using the performance measurement by modifying the plurality of parameters defined by the load profile; and generating, utilizing the modified plurality of parameters in the updated load profile, an updated representative workload configured to further evaluate the performance of the artificial intelligence model of the cloud computing platform under a different computing demand imposed by an updated workload context.

Example Clause B, the method of Example Clause A, wherein the load profile is selected from a plurality of load profiles established for different workload contexts.

Example Clause C, the method of Example Clause A or Example Clause B, wherein the workload context represented by the load profile captures a peak computing demand reaching the computing resource utilizing the artificial intelligence model.

Example Clause D, the method of any one of Example Clause A through C, wherein the workload context represented by the load profile captures a computing demand at the computing resource utilizing the artificial intelligence model that increases and subsequently decreases.

Example Clause E, the method of any one of Example Clause A through D, wherein the computing resource further comprises a model endpoint for simulating a user access point to the artificial intelligence model at the cloud computing platform.

Example Clause F, the method of any one of Example Clause A through E, wherein the representative workload is generated by a plurality of virtual machine instances.

Example Clause G, the method of any one of Example Clause A through F, further comprising generating a quality gate defining an operational window based on a comparison between the performance measurement of the artificial intelligence model for the representative workload against a performance measurement of another iteration of the artificial intelligence model for the representative workload.

Example Clause H, the method of any one of Example Clause A through G, wherein the plurality of parameters includes a number of containers and a number of threads per container.

Example Clause I, the method of any one of Example Clause A through H, wherein the performance measurement comprises at least one of latency or data throughput.

Example Clause J, a system for evaluating a performance of an artificial intelligence model for a cloud computing platform, the method comprising: a processing system; a computer-readable medium having encoded thereon, instructions that when executed by the processing system causes the system to: select a load profile defining a plurality of parameters; generate a representative workload configured to evaluate the performance of the artificial intelligence model for the cloud computing platform under a workload context represented by the load profile; execute the representative workload on a computing resource utilizing the artificial intelligence model; extract a plurality of performance metrics from the from the computing resource following execution of the representative workload on the computing resource utilizing the artificial intelligence model; synthesize a performance measurement based on the plurality of performance metrics extracted from the computing resource; update the load profile using the performance measurement by modifying the plurality of parameters defined by the load profile; and generate, utilizing the modified plurality of parameters in the updated load profile, an updated representative workload configured to further evaluate the performance of the artificial intelligence model of the cloud computing platform under a different workload context.

Example Clause K, the system of Example Clause J, wherein the load profile is selected from a plurality of load profiles established for different workload contexts.

Example Clause L, the system of Example Clause J or Example Clause K, wherein the workload context represented by the load profile captures a peak demand reaching the computing resource utilizing the artificial intelligence model.

Example Clause M, the system of any one of Example Clause J through L, wherein the workload context represented by the load profile captures a demand at the computing resource utilizing the artificial intelligence model that increases and subsequently decreases.

Example Clause N, the system of any one of Example Clause J through M, wherein the plurality of parameters includes a number of containers and a number of threads per container.

Example Clause O, the system of any one of Example Clause J through N, wherein the computer-readable instructions further cause the system to generate a quality gate defining an operational window based on a comparison between the performance measurement of the artificial intelligence model for the representative workload against a performance measurement of another iteration of the artificial intelligence model for the representative workload.

Example Clause P, a computer-readable storage medium having encoded thereon computer-readable instructions that when executed by a processing system causes a system to: select a load profile defining a plurality of parameters; generate a representative workload configured to evaluate the performance of the artificial intelligence model for the cloud computing platform under a workload context represented by the load profile; execute the representative workload on a computing resource utilizing the artificial intelligence model; extract a plurality of performance metrics from the computing resource following execution of the representative workload on the computing resource utilizing the artificial intelligence model; synthesize a performance measurement based on the plurality of performance metrics extracted from the computing resource; and update the load profile using the performance measurement by modifying the plurality of parameters defined by the load profile; generate, utilizing the modified plurality of parameters in the updated load profile, an updated representative workload configured to further evaluate the performance of the artificial intelligence model of the cloud computing platform under a different workload context.

Example Clause Q, the computer-readable storage medium of Example Clause P, wherein the load profile is selected from a plurality of load profiles established for different workload contexts.

Example Clause R, the computer-readable storage medium of Example Clause P or Example Clause Q, wherein the workload context represented by the load profile captures a peak demand reaching the computing resource utilizing the artificial intelligence model.

Example Clause S, the computer-readable storage medium of any one of Example Clause P through R, wherein the workload context represented by the load profile captures a demand at the computing resource utilizing the artificial intelligence model that increases and subsequently decreases.

Example Clause T, the computer-readable storage medium of any one of Example Clause P through S, wherein the computer-readable instructions further cause the system to generate a quality gate defining an operational window based on a comparison between the performance measurement of the artificial intelligence model for the representative workload against a performance measurement of another iteration of the artificial intelligence model for the representative workload.

Conditional language such as, among others, "can," "could," "might" or "may," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example. Conjunctive language such as the phrase "at least one of X, Y or Z," unless specifically stated otherwise, is to be understood to present that an item, term, etc. may be either X, Y, or Z, or a combination thereof.

The terms "a," "an," "the" and similar referents used in the context of describing the invention (especially in the context of the following claims) are to be construed to cover both the singular and the plural unless otherwise indicated herein or clearly contradicted by context. The terms "based on," "based upon," and similar referents are to be construed as meaning "based at least in part" which includes being "based in part" and "based in whole" unless otherwise indicated or clearly contradicted by context.

In addition, any reference to "first," "second," etc. elements within the Summary and/or Detailed Description is not intended to and should not be construed to necessarily correspond to any reference of "first," "second," etc. elements of the claims. Rather, any use of "first" and "second" within the Summary, Detailed Description, and/or claims may be used to distinguish between two different instances of the same element (e.g., two different artificial intelligence models).

In closing, although the various configurations have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

We claim:

1. A method for evaluating a performance of an artificial intelligence model for a cloud computing platform, the method comprising:

selecting a load profile generated to represent a workload context by defining at least a number of containers and a number of threads per container;

generating a representative workload configured to evaluate the performance of the artificial intelligence model for the cloud computing platform under a computing demand imposed by the workload context;

executing the representative workload on a computing resource utilizing the artificial intelligence model;

extracting a plurality of performance metrics from the computing resource following execution of the representative workload on the computing resource utilizing the artificial intelligence model;

synthesizing a performance measurement based on the plurality of performance metrics extracted from the computing resource;

updating the load profile using the performance measurement by modifying the number of containers and the number of threads per container defined by the load profile; and generating, utilizing the modified number of containers and the modified number of threads per container defined by the updated load profile, an updated representative workload configured to further evaluate the performance of the artificial intelligence model for the cloud computing platform under a different computing demand imposed by an updated workload context.

2. The method of claim 1, wherein the load profile is selected from a plurality of load profiles established for different workload contexts.

3. The method of claim 1, wherein the workload context represented by the load profile captures a peak computing demand reaching the computing resource utilizing the artificial intelligence model.

4. The method of claim 1, wherein the workload context represented by the load profile captures a computing demand at the computing resource utilizing the artificial intelligence model that increases and subsequently decreases.

5. The method of claim 1, wherein the computing resource further comprises a model endpoint for simulating a user access point to the artificial intelligence model for the cloud computing platform.

6. The method of claim 1, wherein the representative workload is generated by a plurality of virtual machine instances.

7. The method of claim 1, further comprising generating a quality gate defining an operational window based on a comparison between the performance measurement workload against another performance measurement of another iteration of the artificial intelligence model for the representative workload.

8. The method of claim 1, wherein the performance measurement comprises at least one of latency or data throughput.

9. A system for evaluating a performance of an artificial intelligence model for a cloud computing platform, the system comprising:

a processing system;

a computer-readable medium having encoded thereon, instructions that when executed by the processing system causes the system to:

select a load profile generated to represent a workload context by defining at least a number of containers and a number of threads per container;

generate a representative workload configured to evaluate the performance of the artificial intelligence model for the cloud computing platform under the workload context represented by the load profile;

execute the representative workload on a computing resource utilizing the artificial intelligence model;

extract a plurality of performance metrics from the from the computing resource following execution of the representative workload on the computing resource utilizing the artificial intelligence model;

synthesize a performance measurement based on the plurality of performance metrics extracted from the computing resource;

update the load profile using the performance measurement by modifying the number of containers and the number of threads per container defined by the load profile; and generate, utilizing the modified number of containers and the modified number of threads per container defined by the updated load profile, an updated representative workload configured to further evaluate the performance of the artificial intelligence model for the cloud computing platform under a different workload context.

10. The system of claim 9, wherein the load profile is selected from a plurality of load profiles established for different workload contexts.

11. The system of claim 9, wherein the workload context represented by the load profile captures a peak demand reaching the computing resource utilizing the artificial intelligence model.

12. The system of claim 9, wherein the workload context represented by the load profile captures a demand at the computing resource utilizing the artificial intelligence model that increases and subsequently decreases.

13. The system of claim 9, wherein the computing resource further comprises a model endpoint for simulating a user access point to the artificial intelligence model for the cloud computing platform.

14. The system of claim 9, wherein the computer-readable instructions further cause the system to generate a quality gate defining an operational window based on a comparison between the performance measurement against another performance measurement of another iteration of the artificial intelligence model for the representative workload.

15. A computer-readable storage medium having encoded thereon computer-readable instructions that when executed by a processing system causes a system to:

select a load profile generated to represent a workload context by defining at least a number of containers and a number of threads per container;

generate a representative workload configured to evaluate a performance of an artificial intelligence model for a cloud computing platform under the workload context represented by the load profile;

execute the representative workload on a computing resource utilizing the artificial intelligence model;

extract a plurality of performance metrics from the computing resource following execution of the representative workload on the computing resource utilizing the artificial intelligence model;

synthesize a performance measurement based on the plurality of performance metrics extracted from the computing resource;

update the load profile using the performance measurement by modifying the number of containers and the number of threads per container defined by the load profile; and generate, utilizing the modified number of containers and the modified number of threads per container defined by the updated load profile, an updated representative workload configured to further evaluate the performance of the artificial intelligence model for the cloud computing platform under a different workload context.

16. The computer-readable storage medium of claim 15, wherein the load profile is selected from a plurality of load profiles established for different workload contexts.

17. The computer-readable storage medium of claim 15, wherein the workload context represented by the load profile captures a peak demand reaching the computing resource utilizing the artificial intelligence model.

18. The computer-readable storage medium of claim 15, wherein the workload context represented by the load profile captures a demand at the computing resource utilizing the artificial intelligence model that increases and subsequently decreases.

19. The computer-readable storage medium of claim 15, wherein the computer-readable instructions further cause the system to generate a quality gate defining an operational window based on a comparison between the performance measurement against another performance measurement of another iteration of the artificial intelligence model for the representative workload.

20. The computer-readable storage medium of claim 15, wherein the computing resource further comprises a model endpoint for simulating a user access point to the artificial intelligence model for the cloud computing platform.

\* \* \* \* \*